US007276221B2

(12) United States Patent
Charter

(10) Patent No.: US 7,276,221 B2
(45) Date of Patent: Oct. 2, 2007

(54) CARBONATED WATER PRODUCED BY DIAMOND VAPORIZATION

(76) Inventor: John Charter, 417 Fenwick Ct., DeBary, FL (US) 32713

( * ) Notice: Subject to any disclaimer, the term of this patent is extended or adjusted under 35 U.S.C. 154(b) by 494 days.

(21) Appl. No.: 10/849,413

(22) Filed: May 19, 2004

(65) Prior Publication Data

US 2004/0265207 A1 Dec. 30, 2004

Related U.S. Application Data

(60) Provisional application No. 60/480,932, filed on Jun. 24, 2003.

(51) Int. Cl.
*C01B 31/20* (2006.01)
(52) U.S. Cl. .................................. 423/437.1
(58) Field of Classification Search ............. 423/437.1, 423/446–447.9
See application file for complete search history.

(56) References Cited

U.S. PATENT DOCUMENTS

| 3,208,935 | A | * | 9/1965 | Nesbitt | 210/749 |
| 4,978,550 | A | * | 12/1990 | Menon et al. | 426/549 |
| 6,113,080 | A | * | 9/2000 | Kazuma | 261/115 |
| 6,237,284 | B1 | * | 5/2001 | Erickson | 47/58.1 R |

OTHER PUBLICATIONS

"Inorganic Chemistry—The Products of the Combustion of Diamonds", C.R. Acad. Sc. Paris, V. 276, Series C, pp. 787-789. Feb. 26, 1973.*

* cited by examiner

*Primary Examiner*—Stanley S. Silverman
*Assistant Examiner*—Paul Wartalowicz
(74) *Attorney, Agent, or Firm*—Charles R. Wilson

(57) ABSTRACT

A method of producing carbonated water comprises the steps of adding liquid oxygen to a vessel, heating a diamond or quantity of diamonds, and adding the heated diamond(s) to the liquid oxygen to produce carbon dioxide. The carbon dioxide is next infused into water or first pressurized and then infused into water. The resulting product is a diamond derived carbonated water.

11 Claims, 2 Drawing Sheets

CARBONATED WATER PRODUCED BY DIAMOND VAPORIZATION

This application claims the benefit of U.S. Provisional Application No. 60/480,932 filed Jun. 24, 2003.

FIELD OF THE INVENTION

The invention is the method and use of diamond carbon atoms (as a chemically compounded gas, vapor or amorphous carbon) as an additive to products.

BACKGROUND OF THE INVENTION

I have recognized diamond carbon as a unique form of carbon. It is primordial carbon, owing to the fact that natural diamonds are billions of years old and that diamonds do not change form chemically nor do they mechanically change as they are the hardest material in nature.

The carbon of diamond endures as diamond and can be captured in another state by the conscious and intelligent action of man in releasing it from the diamond lattice, while also capturing it for inclusion in products. The burning or transformation of a diamond into another form of its unique carbon marks a singular moment in an immense span of time. The connection of these thoughts and realizations, and method of making diamond water and/or other products containing diamond carbon to add value is my invention and has been accomplished by me.

SUMMARY OF THE INVENTION

Naturally occurring diamonds are processed to form carbon dioxide. The carbon dioxide is captured in water for ultimate consumer use. The diamonds are initially heated and added to liquid oxygen. Carbon dioxide which is formed is captured. It is then added to water in a manner to cause the carbon dioxide to be solubilized in the water. The carbon dioxide-containing water is unique in the fact it is derived from diamonds.

DETAILED DESCRIPTION OF THE INVENTION

Diamondized water is produced by my method using diamonds as the starting material. Diamonds are well known and commercially available. They are available in various sizes in jewelry grade as well as industrial grade.

Figure 1:
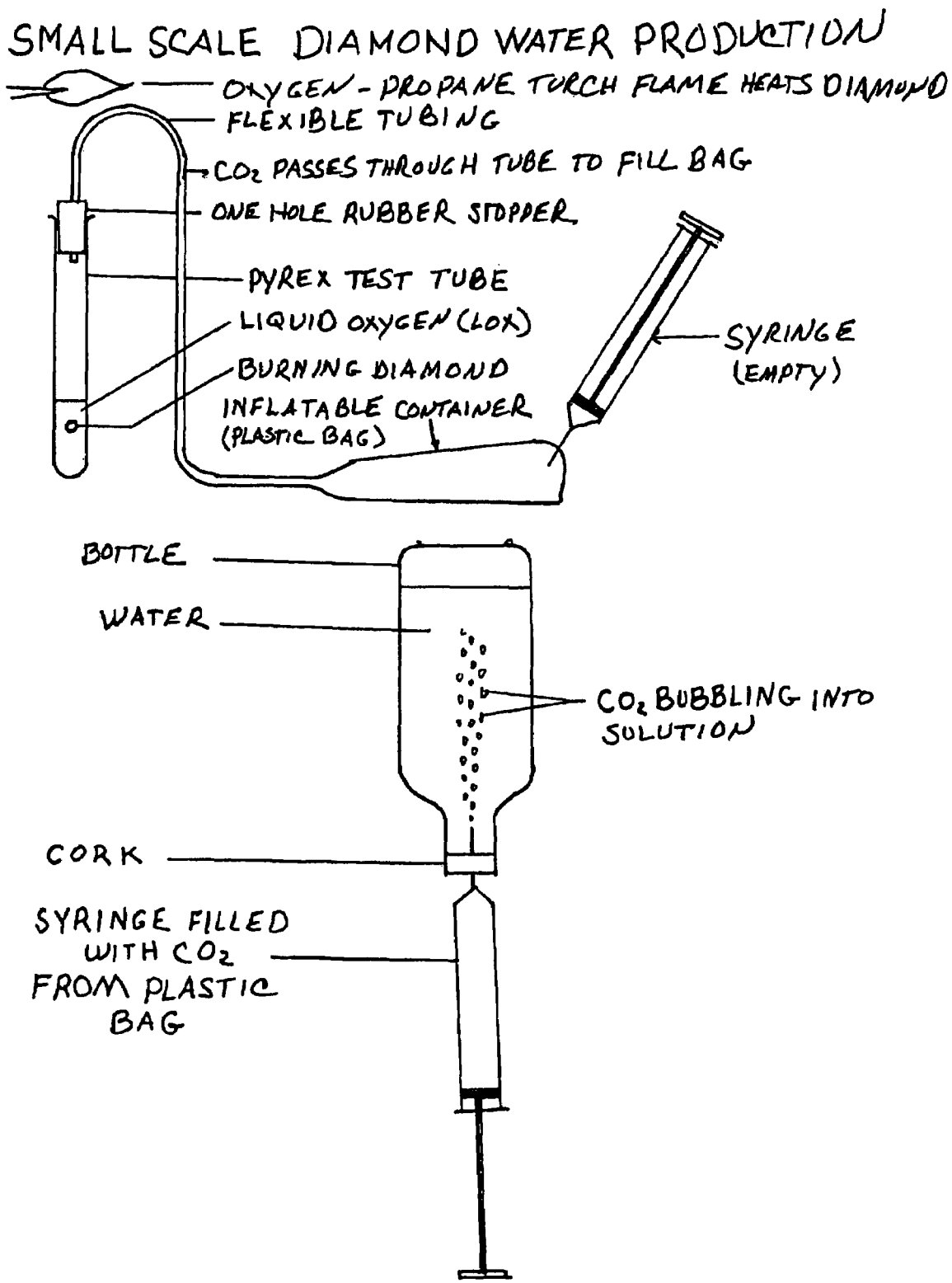
FIG. 1 is a schematic of a small scale method of producing diamondized water of my invention.

With reference to FIG. 1, a method of producing diamondized water on a small scale is schematically shown. Initially, liquid oxygen (lox) is poured into a Pyrex test tube which is held in a ring stand. A small diamond is held and heated to white heat in an oxygen propane flame and dropped immediately into the test tube. A stopper fitted with two feet of a small diameter flexible tubing is immediately inserted into the test tube. The carbon dioxide gas resulting from the combustion of the diamond travels through the flexible tubing and bubbles directly into a container containing water or into an expandable container for later infusion into water or products by using a large syringe or a pump. This procedure produces carbon dioxide (from the carbon of diamond) which is unique and soluble in water and also combines chemically with water to form carbonic acid so the original diamond carbon atom is chemically combined in the water.

Figure 2:
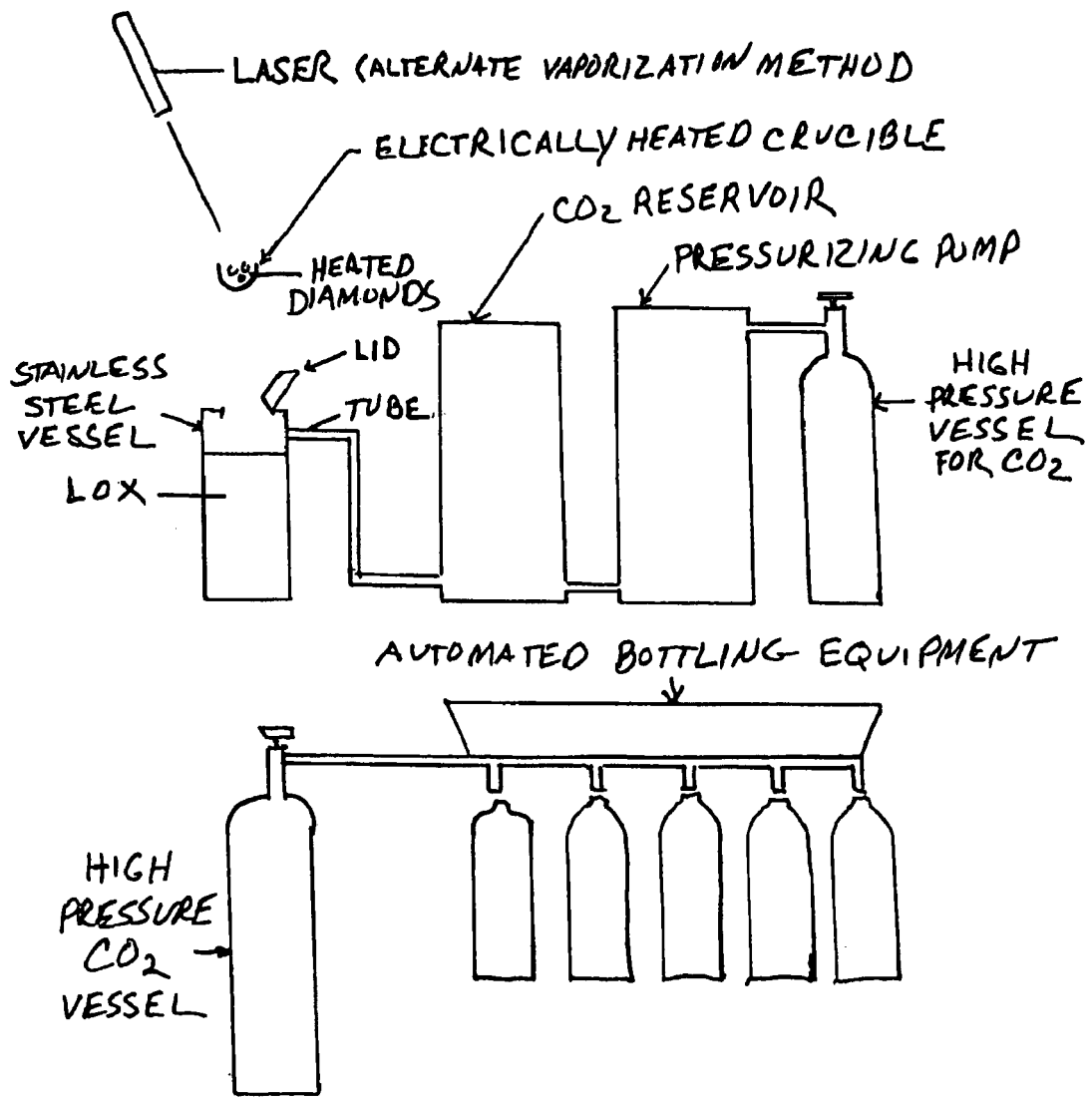
FIG. 2 is a schematic of a commercial scale method of producing diamondized water of my invention.

The apparatus described above is simply scaled up to a larger size to safely accommodate greater reactions resulting from the burning of larger amounts of diamond. FIG. 2 is a schematic showing another method of producing diamondized water. This depicted method is more conducive to the commercialization of the diamondized water. Thus, initially a stainless steel vessel is charged with liquid oxygen. An electronically heated crucible is next charged with a quantity of diamonds. The diamonds are now subjected to laser energy or some method of vaporization. Carbon dioxide, created by the diamonds and oxygen, is directed through a tube into a reservoir. It is subsequently subjected to a pressurized pump and forced into a high pressure vessel. This vessel with its pressurized carbon dioxide is ultimately used in automated bottling equipment to inject the carbon dioxide into bottles of water to form a unique form of carbonated water.

The amount of diamond carbon present in my diamondized water will be stated in carats or some other measure to add value to the product. Still other variations and features to enhance the marketability of the diamondized water are possible.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

The invention claimed is:

1. A method for producing carbonated water comprising:
 (a) adding liquid oxygen to a vessel;
 (b) heating at least one diamond to a white heat;
 (c) adding the heated at least one diamond to the liquid oxygen to produce carbon dioxide; and
 (d) infusing the carbon dioxide into water to produce the carbonated water.

2. The method of claim 1 further comprising the step of capturing the carbon dioxide in a container before infusing it into the water.

3. The method of claim 1 wherein the at least one diamond is heated by an oxygen propane torch.

4. The method of claim 1 further comprising the steps of capturing the carbon dioxide in an inflatable container and subsequently bubbling the carbon dioxide into the water.

5. The method of claim 1 wherein a quantity of diamonds is subjected to laser energy before adding them to the liquid oxygen.

6. The method of claim 5 further comprising the step of capturing the carbon dioxide in a container and pressurizing it before infusing it into the water to produce the carbonated water.

7. The method of claim 6 wherein the water is bottled and the pressurized carbon dioxide is introduced into the bottled water to produce the carbonated water.

8. A method for producing carbonated water comprising:
 (a) adding liquid oxygen to a vessel;
 (b) heating a diamond to a white heat;
 (c) adding the heated diamond to the liquid oxygen to produce carbon dioxide;
 (d) capturing the carbon dioxide in an inflatable container; and e) transferring the carbon dioxide from the inflatable container into water by bubbling therethrough to produce the carbonated water.

9. The method of claim 8 wherein the diamond is heated by an oxygen propane torch.

10. A method for producing carbonated water comprising:
(a) adding liquid oxygen to a vessel;
(b) heating a quantity of diamonds in an electrically heated crucible;
(c) adding the heated diamonds to the liquid oxygen to produce carbon dioxide;
(d) capturing the carbon dioxide in a container;
(e) pressurizing the carbon dioxide of step (d); and
(f) infusing the pressurized carbon dioxide into bottled water to produce the carbonated water.

11. The method of claim 10 wherein the quantity of diamonds is subjected laser energy before adding them to the liquid oxygen.

* * * * *